United States Patent [19]

Shiratori

[11] Patent Number: 5,751,669
[45] Date of Patent: May 12, 1998

[54] OVERWRITABLE MAGNETOOPTICAL RECORDING METHOD IN WHICH THE RECORDING MEDIUM IS COOLED AFTER IRRADIATION

[75] Inventor: Tsutomu Shiratori, Yokohama, Japan

[73] Assignee: Canon Kabushiki Kaisha, Tokyo, Japan

[21] Appl. No.: 666,918

[22] Filed: Jun. 19, 1996

Related U.S. Application Data

[63] Continuation of Ser. No. 510,578, Aug. 2, 1995, abandoned, which is a continuation of Ser. No. 134,679, Oct. 13, 1993, abandoned.

[30] Foreign Application Priority Data

Oct. 16, 1992 [JP] Japan ..................... 4-279048

[51] Int. Cl.$^6$ .................................. G11B 13/04
[52] U.S. Cl. ............... 369/13; 369/288; 428/694 EC
[58] Field of Search .................. 369/13, 14, 15, 369/275.3, 275.2, 110, 116, 288, 284, 286, 124, 283, 275.4; 360/59, 114; 428/694 EC, 694 MM

[56] References Cited

U.S. PATENT DOCUMENTS

| | | | |
|---|---|---|---|
| 5,163,031 | 11/1992 | Osato | 369/13 |
| 5,175,714 | 12/1992 | Kikitsu et al. | 369/13 |
| 5,208,797 | 5/1993 | Nakaki et al. | 369/100 |
| 5,235,569 | 8/1993 | Matsumoto et al. | 369/13 |
| 5,239,524 | 8/1993 | Sato et al. | 369/13 |
| 5,309,427 | 5/1994 | Matsumoto | 369/275.2 |
| 5,325,343 | 6/1994 | Ohtsuki | 369/13 |
| 5,329,505 | 7/1994 | Ohtsuki | 369/13 |

FOREIGN PATENT DOCUMENTS

| | | |
|---|---|---|
| 0285461 | 10/1988 | European Pat. Off. . |
| 0352548 | 1/1990 | European Pat. Off. . |
| 0477701 | 4/1992 | European Pat. Off. . |
| 0481786 | 4/1992 | European Pat. Off. . |
| 62-175948 | 8/1987 | Japan . |
| 0244443 | 9/1990 | Japan . |

OTHER PUBLICATIONS

"Thermomagnetic Recording Medium For A Direct–Overwrite Recording System," vol. 32, No. 4A, pp. 384–386, XP 39916 (Sep. 1989).

"Initializing Process on Direct Overwrite Method Using Exchange–Coupled Quadri–Layered Magneto–Optical Film," IEEE Transactions on Magnetics, vol. 26, No. 5, pp. 1900–1902, XP150466 (Sep. 1990).

*Primary Examiner*—Ali Neyzari
*Attorney, Agent, or Firm*—Fitzpatrick, Cella, Harper & Scinto

[57] ABSTRACT

A light beam modulated according to a data signal to be recorded is irradiates a magnetooptical recording medium while moving the recording medium. During a series of recording operations, a predetermined recording area of the recording medium is heated to a temperature of a second temperature $T_2$ or higher in accordance with the data signal and at least a part of the area heated to the temperature of second temperature $T_2$ or higher is once cooled down to a temperature of a third temperature $T_3$ or lower. Then, it is heated to a temperature of a first temperature $T_1$ or higher. Thus, the recording medium is locally heated or cooled, so that recording of information is performed.

6 Claims, 12 Drawing Sheets

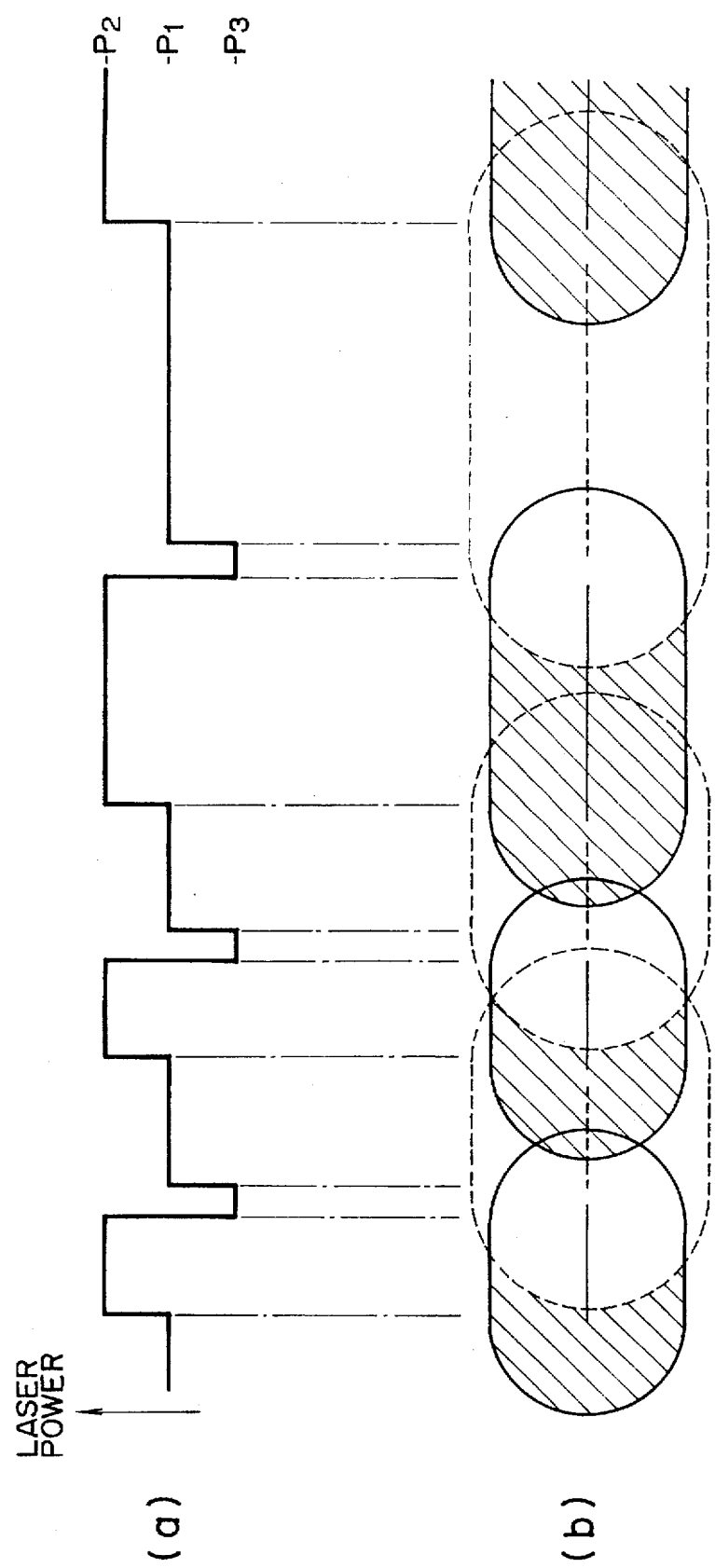

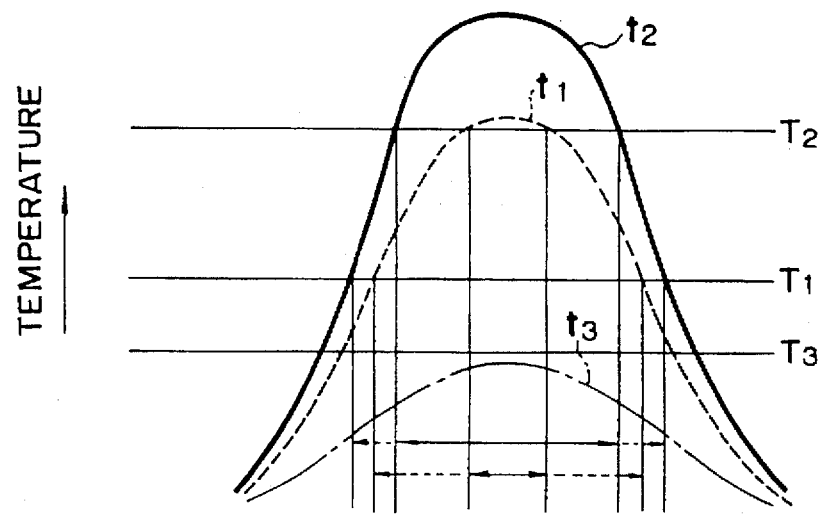
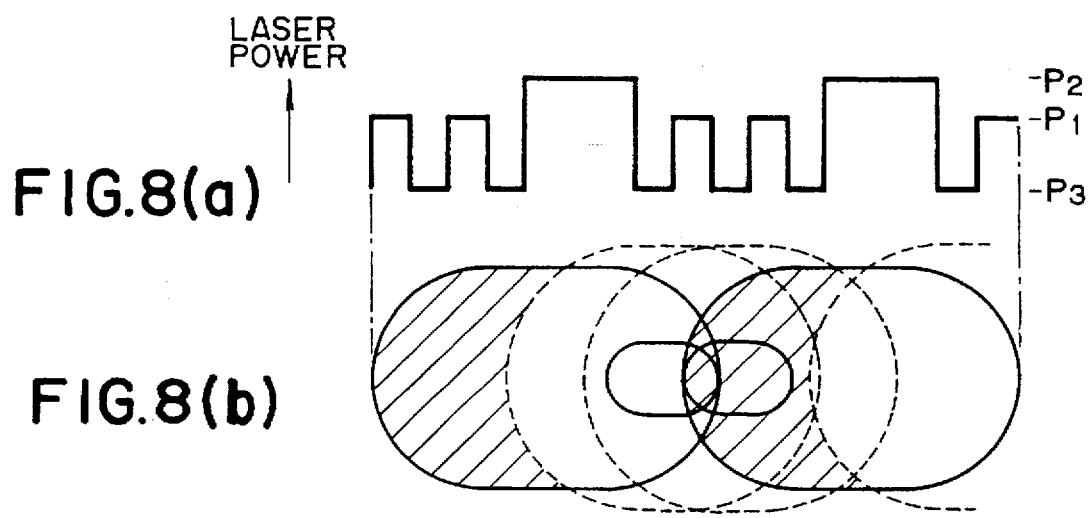

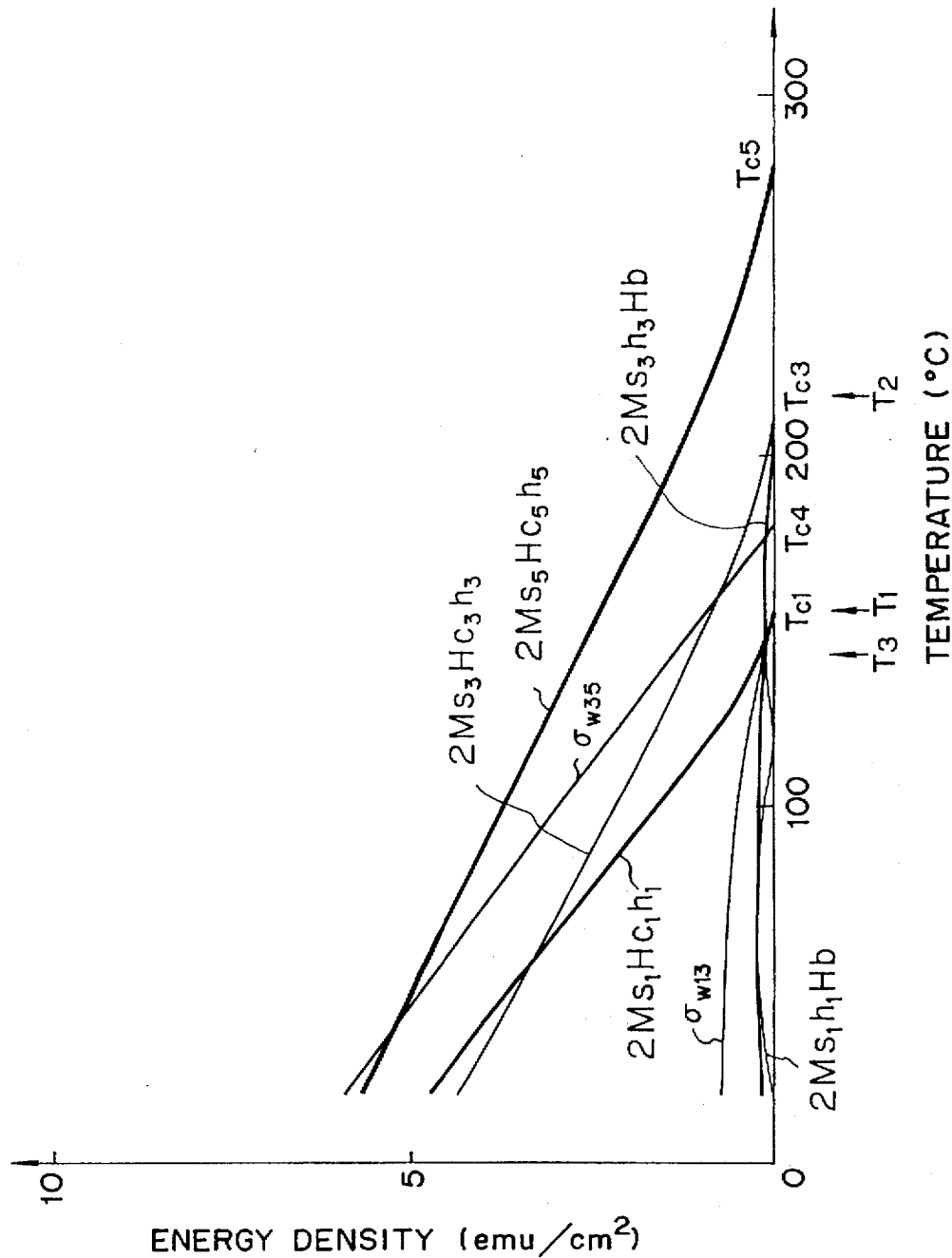

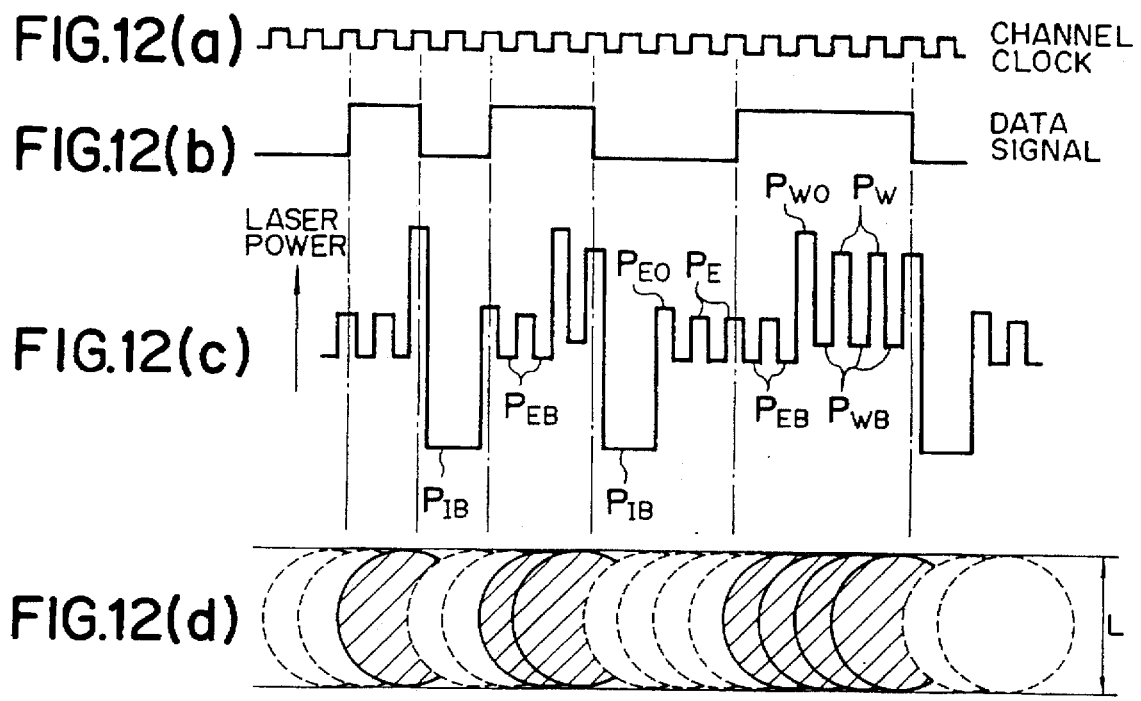
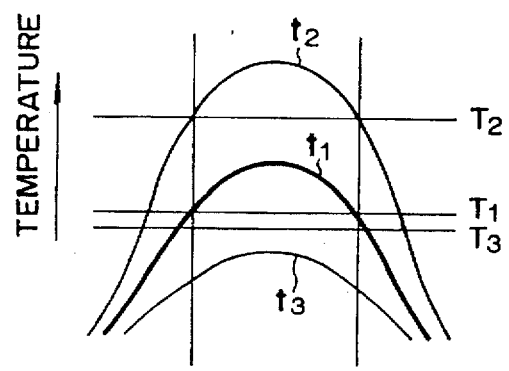

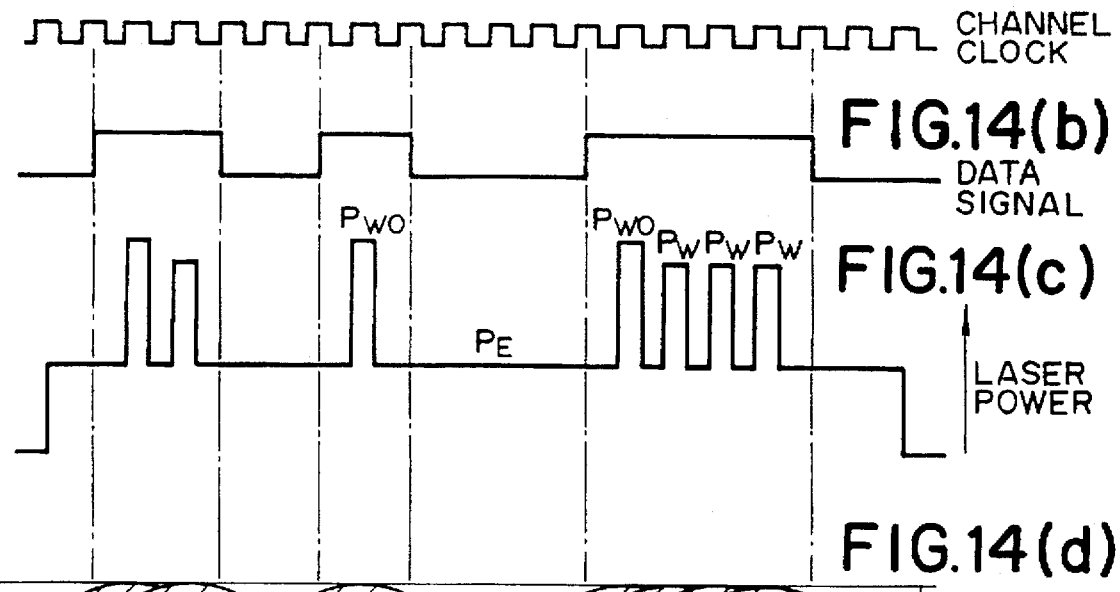
FIG.14(a) CHANNEL CLOCK
FIG.14(b) DATA SIGNAL
FIG.14(c) LASER POWER
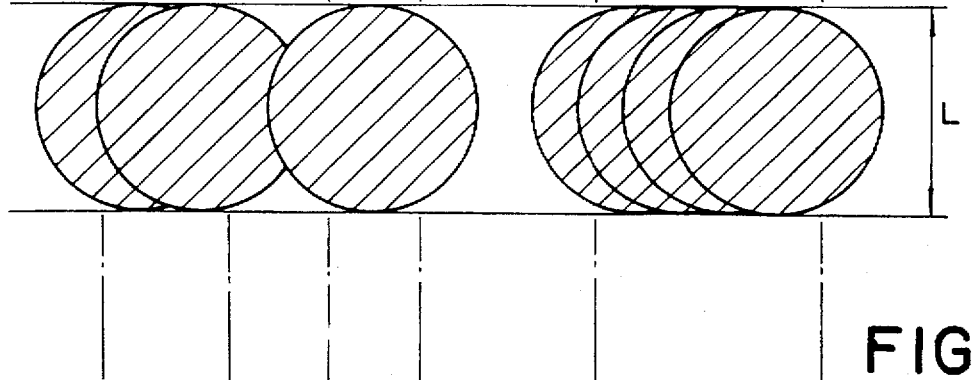
FIG.14(d)
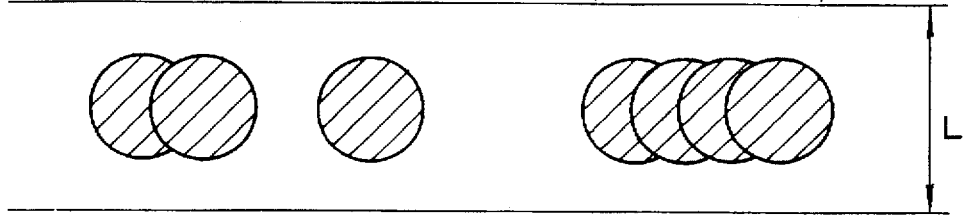
FIG.14(e)

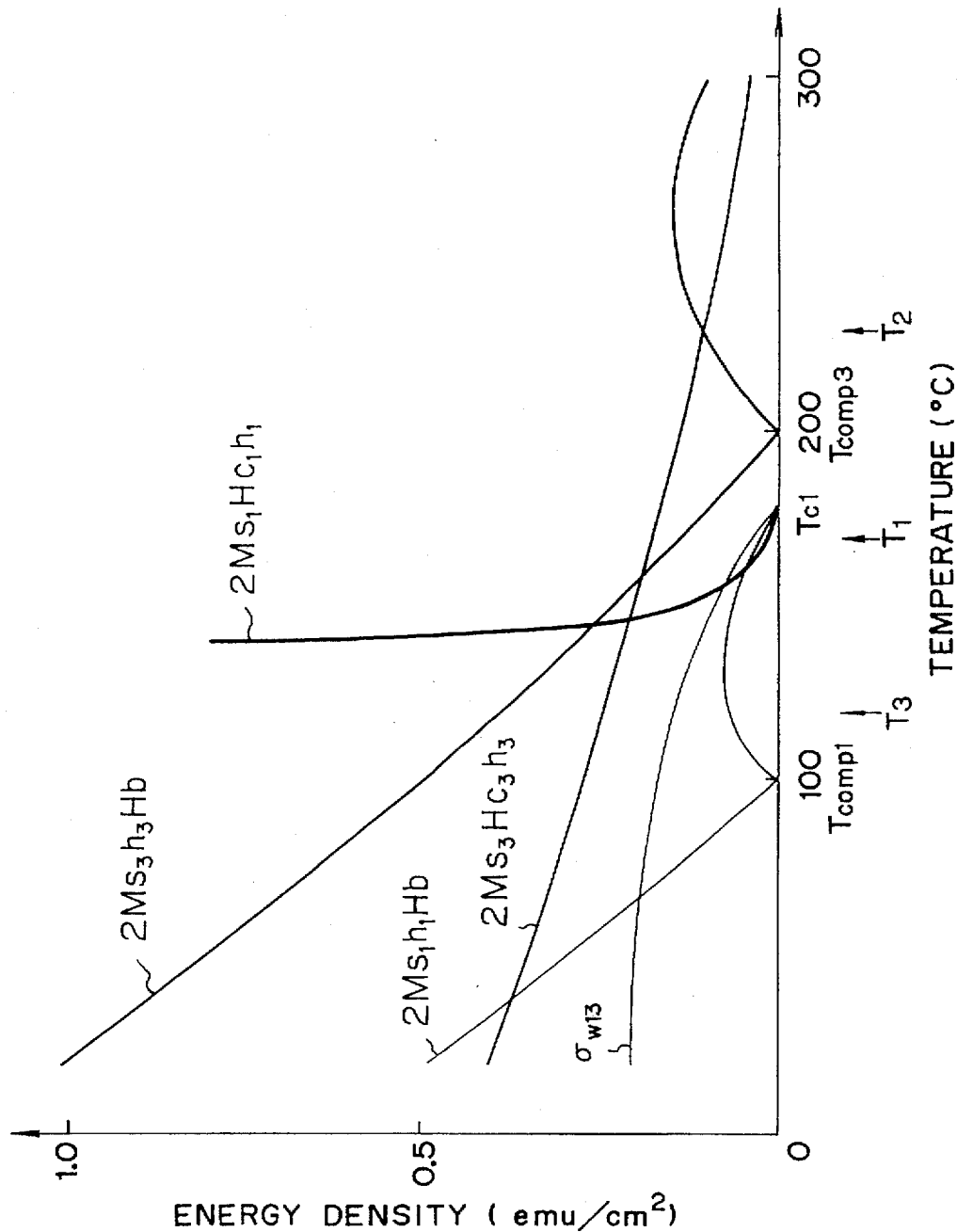

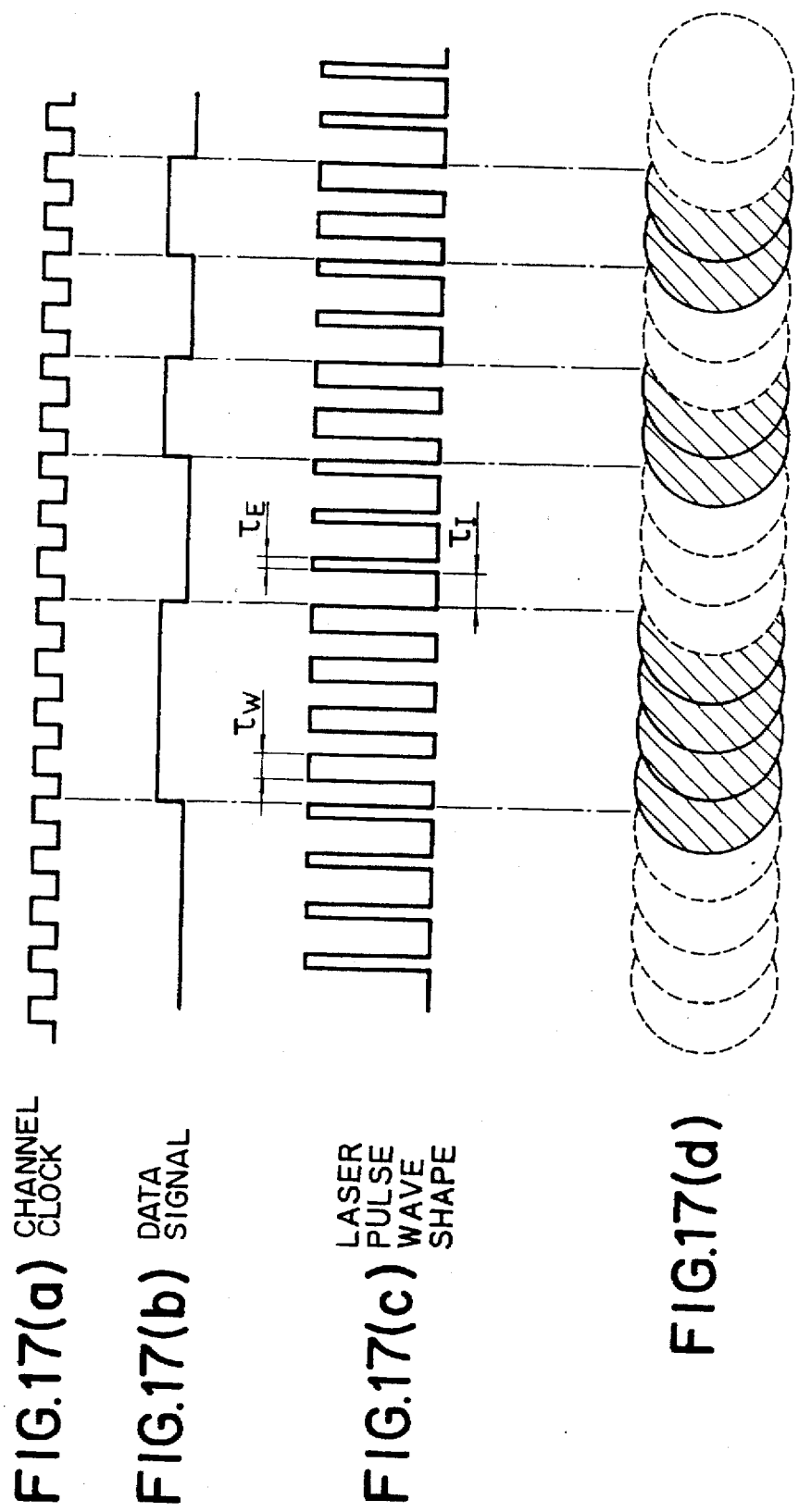

OVERWRITABLE MAGNETOOPTICAL RECORDING METHOD IN WHICH THE RECORDING MEDIUM IS COOLED AFTER IRRADIATION

This application is a continuation of application Ser. No. 08/510,578, filed Aug. 2, 1995, now abandoned, which in turn was a continuation of application Ser. No. 08/134,679, filed Oct. 13, 1993, also abandoned.

BACKGROUND OF THE INVENTION

1. Field of the Invention

The invention relates to a magneooptic information recording method and, more particularly, to a magnetooptic information recording method which can perform overwriting (overwrite recording) by modulating a light beam.

2. Related Background Art

As a technique to perform overwriting to a magnetooptic recording medium, a magnetic field modulating method or a light modulating method using a switched connection laminate film shown in Japanese Patent Application Laid-Open No. 62-175948 has hitherto been known. As compared with the magnetic field modulating method, the light modulating method is more advantageous from a viewpoint such that a modulating speed can be raised and a double-sided medium can be used or the like. As a method of recording to a magnetooptic recording medium (magnetooptic disk) at a high recording density, a method whereby information is recorded at both ends of a mark written on the medium, namely, what is called a mark edge recording method is known.

In case of performing mark edge recording by light modulating method, the positions of the edges of a mark which is formed fluctuate due to an influence by a heat accumulation or a thermal diffusion upon recording, so that there is a problem such that a jitter of an edge signal increases upon detection (upon reproduction). A size of the mark which is formed by the light modulating method, on the other hand, depends on a spot diameter of a light beam which is used for recording. In order to form a mark smaller than a size of about a diffraction limit of the light beam, only the edge portion (peak portion with respect to the temperature) of a temperature distribution of the Gaussian distribution curve type which occurs due to the irradiation of the converged light beam must be used, so that there is a problem such that the size of the mark easily becomes unstable.

On the other hand, since the spot shape of light beam is almost circular, when a mark of a pitch that is relatively short as compared with a track width is formed, the mark size in the track width direction also decreases. Now, assuming that the spot diameter of the light which is used for reproduction is equal to about a track width, an amplitude of a reproduction signal from such a mark is smaller than that of the mark formed in the whole track width at the same pitch as that of the above mark, so that there is a problem such that a DC offset increases.

SUMMARY OF THE INVENTION

It is an object of the invention to provide a magnetooptic information recording method which can stably perform an overwriting at a high recording density and can obtain a good reproduction signal.

The above object is accomplished by a magnetooptic information recording method whereby a light beam which was modulated in accordance with a data signal to be recorded is irradiated while moving a magnetooptic recording medium and the magnetooptic recording medium is locally heated or cooled, thereby recording, wherein during a series of recording operations, a predetermined recording area of the magnetooptic recording medium is heated to a temperature of a second temperature $T_2$ or higher in accordance with the data signal and at least a part of the area heated to the temperature of the second temperature $T_2$ or higher is once cooled down to a temperature of a third temperature $T_3$ or lower and, after that, it is heated to a temperature of a first temperature $T_1$ or higher.

BRIEF DESCRIPTION OF THE DRAWINGS

FIG. 6 is a diagram showing the relation between the laser signal according to the recording signal and the temperature distribution in the magnetooptic recording medium;

FIG. 7 is a diagram showing the relation between the laser power and the temperature distribution in the second embodiment;

FIG. 8(A–B) are diagrams showing the relation between the laser signal according to the recording signal and the temperature distribution in the magnetooptic recording medium;

FIG. 11 is a characteristics graph showing a temperature dependency of magnetic characteristics of each magnetic layer in the magnetooptic recording medium of the fourth embodiment;

FIGS. 12(A–D) are diagrams showing the relation among the recording signal, the laser signal according to the recording signal, and the temperature distribution in the magnetooptic recording medium in the fourth embodiment;

FIG. 13 is a diagram showing the temperature distribution;

FIGS. 14(A–E) are diagrams showing the relation among the recording signal, the laser signal according to the recording signal, and the temperature distribution in the magnetooptic recording medium in the first comparison example;

FIG. 16 is a characteristics diagram showing a temperature dependency of magnetic characteristics of each magnetic layer in a magnetooptic recording medium which is used in the fifth embodiment; and FIGS. 17(A–D) are diagrams showing the relation among the recording signal, the laser signal according to the recording signal, and the temperature distribution in the magnetooptic recording medium in the fifth embodiment.

DETAILED DESCRIPTION OF THE PREFERRED EMBODIMENTS

Figure 1:
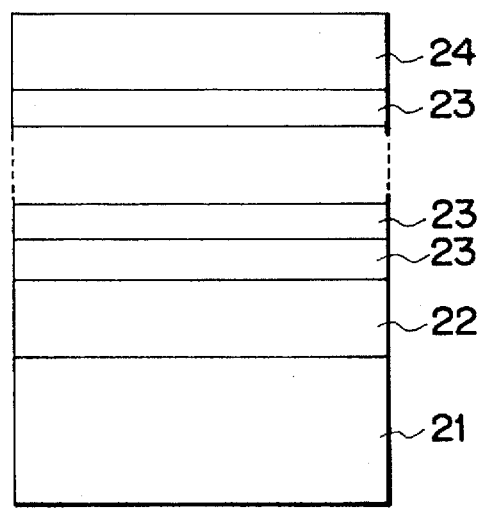
FIG. 1 is a schematic cross sectional view showing a construction of a magnetooptic recording medium which is used in a magnetooptic information recording method of the invention.

A magnetooptic recording medium which is used in a magnetooptic information recording method of the invention has at least: a first magnetic layer having a Curie temperature $T_1$; and a second magnetic layer which has a Curie temperature $T_2$ higher than $T_1$ and is switchingly connected with the first magnetic layer. The second magnetic layer always has a predetermined magnetizing state at an ambient temperature. A binary recording is performed in dependence on whether the magnetizing state of the first magnetic layer has a stable orientation for the second magnetic layer due to the coupling by an exchange force or not. That is, by heating the first magnetic layer to about a temperature exceeding a first temperature $T_1$ from the ambient temperature, the magnetizing state of the first magnetic layer is set to a stable orientation for the second magnetic layer. By cooling those layers down to the ambient temperature, the magnetizing states of the first and second magnetic layers are held. One of the recording states of the binary recording in which the first magnetic layer is oriented to the stable state for the second magnetic layer is obtained.

On the other hand, by heating from the ambient temperature to about a temperature exceeding a second temperature $T_2$, the second magnetic layer is set to a magnetizing state different from that at the ambient temperature due to an influence by the external magnetic field. In association with it, the magnetizing state of the first magnetic layer also changes (while keeping the stable orientation for the second magnetic layer). By cooling down to the ambient temperature in this state, when the temperature passes through a third temperature $T_3$, the magnetizing state of the second magnetic layer changes to the magnetizing state at the ambient temperature without changing the magnetizing state of the first magnetic layer. Another recording state of the binary recording in which the first magnetic layer is oriented to the unstable state for the second magnetic layer is obtained.

The operation in case of recording while moving the magnetooptic recording medium will now be considered. As mentioned above, a recording mark in a magnetizing state different from the ambient magnetizing state is formed in the area which was heated to a temperature of the second temperature $T_2$ or higher. When the portion formed with such a mark is cooled from the heated state to a temperature of the third temperature $T_3$ or lower, the second magnetic layer is initialized to a predetermined magnetizing state by the switched connection force of another adjacent magnetic layer or by an external initialization magnetic field. The magnetizing state of the first magnetic layer, however, is maintained as it is and the mark is held (recording operation). By again heating after that, the first magnetic layer is also initialized (stable orientation for the second magnetic layer) in the area at a temperature of the first temperature $T_1$ or higher in the area in which the second magnetic layer was initialized, so that the mark formed is erased (erasing operation). Since the medium is moved, the whole portion of the formed mark is not erased but only the rear portion with respect to the moving direction in the formed mark is erased. Therefore, a mark of a pitch that is relatively shorter than the track width can be stably formed without changing the mark size in the track width direction.

After the mark was formed, since the magnetic layer is once cooled down to the third temperature $T_3$ or lower, when the next mark is recorded, influence by the thermal diffusion decreases, a fluctuation by the recording pattern at the edge position of the mark which is newly formed decreases, and a jitter of the edge signal is suppressed upon reproduction of the signal.

In the magnetooptic recording medium which is used in the invention, in order to further stably perform the recording by the above recording method, it is preferable that a difference between the first and third temperatures $T_1$ and $T_3$ is equal to or less than 80° C., more preferably, 40° C. or lower and, further more desirably, 20° C. or less.

Third and fourth magnetic layers are sequentially laminated onto the second magnetic layer so as to be neighboring. The fourth magnetic layer is formed so that a predetermined magnetizing state can be held in the whole temperature raising and cooling steps upon recording. The Curie temperature of the third magnetic layer can be also set to be higher than the Curie temperature of the first magnetic layer.

A specific embodiment to which the present invention is applied will now be described with reference to the drawings hereinbelow. FIG. 1 is a schematic cross sectional view showing a construction of an embodiment of a magnetooptic recording medium which is used in the invention.

The magnetooptic recording medium is constructed in a manner such that a plurality of magnetic layers 23 are sequentially laminated through a dielectric layer 22 onto a transparent substrate 21 made by polycarbonate, glass, or the like, and a dielectric layer 24 is again finally laminated as a protective film. The dielectric layers 22 and 24 can use a transparent dielectric material such as $Si_3N_4$, AlN, $SiO_2$, SiO, ZnS, $MgF_2$, or the like. Each of the dielectric layers 22 and 24 and each of the magnetic layers 23 are deposited and formed by a continuous sputtering by, for example, a magnetron sputtering apparatus, a continuous evaporation deposition, or the like. Particularly, by continuous forming the magnetic layers 23 without breaking a vacuum state, they are mutually switchingly coupled.

In the magnetooptic recording medium, it is considered that each magnetic layer 23 is made by various magnetic materials. For example, each magnetic layer 23 can be formed by a rare earth—iron group amorphous alloy which is constructed by 10 to 40 atom % of one or two or more kinds of rare earth elements such as Pr, Nd, Sm, Gd, Tb, Dy, Ho, etc. and 90 to 60 atom % of one or two or more kinds of iron group elements of Fe, Co, Ni, and the like. On the other hand, in order to improve a corrosion resistance or the like, a small quantity of element such as Cr, Mn, Cu, Ti, Al, Si, Pt, In, etc. can be also added to such an alloy.

In case of forming the magnetic layer 23 by the rare earth—iron group amorphous alloy, the saturation magnetization of each magnetic layer 23 can be controlled by a composition ratio of the rare earth element and the iron group element. Although the Curie temperature can be also controlled by the composition ratio, in order to control the Curie temperature independently of the saturation magnetization, it is possible to preferably use a method of controlling a substitution amount by using a material in which a part of Fe as an iron group element is substituted by Co. Namely, by substituting one atom % of Fe with Co, there is a prospect of an increase in Curie temperature of about 6° C. Therefore, an addition amount of Co is adjusted by the above relation so as to obtain a desired Curie temperature. By adding a very small amount of a nonmagnetic element such as Cr, Ti, or the like, the Curie temperature can be also contrarily reduced. Or, the Curie temperature can be also controlled by using two or more kinds of rare earth elements and by adjusting their composition ratio.

The magnetic layers 23 will now be further described in detail. Two of the magnetic layers 23 are the first and second magnetic layers. With respect to the first and second magnetic layers, the following five conditions are all satisfied.

(1) The first and second magnetic layers are mutually exchange-coupled.

(2) At the ambient temperature, the second magnetic layer is oriented to a predetermined magnetizing state and the first magnetic layer is oriented to an arbitrary magnetizing state independently of the second magnetic layer.

(3) In the temperature raising step or cooling step, when the temperature is equal to or higher than the first temperature $T_1$ that is higher than the ambient temperature, the first magnetic layer is oriented to a state in which the coupling by the exchange-coupling force with the second magnetic layer is stable.

(4) In the temperature raising step or cooling step, when the temperature is equal to or higher than the second temperature $T_2$ that is higher than the first temperature $T_1$, the second magnetic layer is oriented to a magnetizing state different from a predetermined magnetizing state.

(5) In the cooling step, when the temperature is equal to or lower than the third temperature $T_3$ which is higher than the ambient temperature and is lower than the first temperature $T_1$, the second magnetic layer is oriented to the predetermined magnetizing state and the first magnetic layer holds the magnetizing state just before independently of the second magnetic layer.

Figure 2:
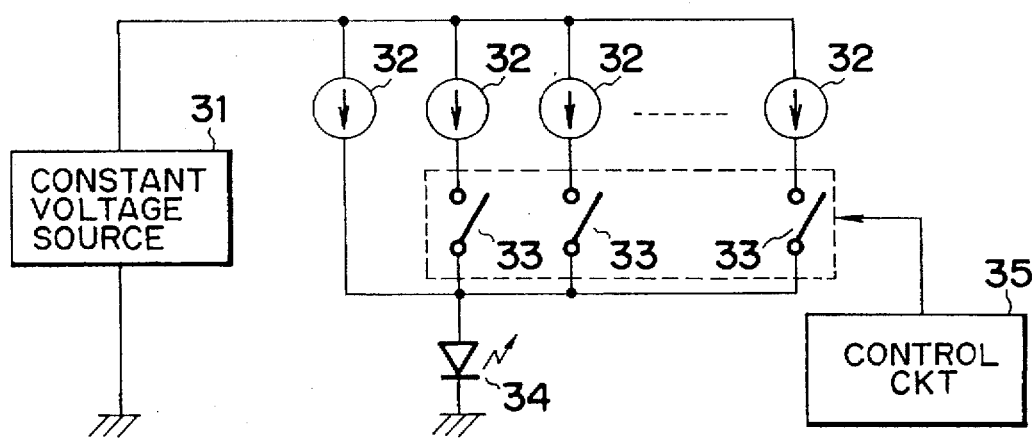
FIG. 2 is a circuit diagram showing an example of a construction of a laser driving circuit to embody the magnetooptic information recording method of the invention.

A magnetooptic recording and/or reproducing apparatus which is used for recording to the magnetooptic recording medium of the embodiment will now be described. In the embodiment, since there is a case of recording to the magnetooptic recording medium by a using recording power of a multivalue, a laser driving circuit as shown in FIG. 2 is used. The laser driving circuit uses a plurality of constant current sources 32 arranged in parallel in order to drive a laser diode 34. One end of each of the constant current sources 32 is commonly connected to a constant voltage source 31 and the other end is commonly connected to the laser diode 34 through a switching device 33 provided for every constant current source 32. Only one of a plurality of constant current sources 32 is directly connected to a connecting point of the laser diode 34 without using the switching device. Each switching device 33 can turn on or off a current at a high speed and is controlled by a control circuit 35. A data signal to be recorded and a reference clock (channel clock) are supplied to the control circuit 35. By using such a laser driving circuit, a laser beam at an output level of a multivalue can be generated at an arbitrary timing in accordance with the recording signal. A construction of the other portions of the magnetooptic recording and/or reproducing apparatus is similar to that of the conventional magnetooptic recording and/or reproducing apparatus. In the recording method of the invention, since the overwriting can be performed by the light modulation, a fixed permanent magnet can be used as recording bias magnetic field generating means for generating a magnetic field that is applied to the magnetooptic recording medium upon recording. A floating magnetic field of the magnetooptic recording medium itself, a leakage magnetic field from an actuator, or the like can be also used according to the circumstances. In such a case, the recording bias magnetic field generating means can be omitted.

The magnetooptic recording medium which is used in the invention was actually manufactured and the result in the case where the recording was performed in accordance with the recording method of the invention will now be described.
(First Embodiment)

Figure 3:
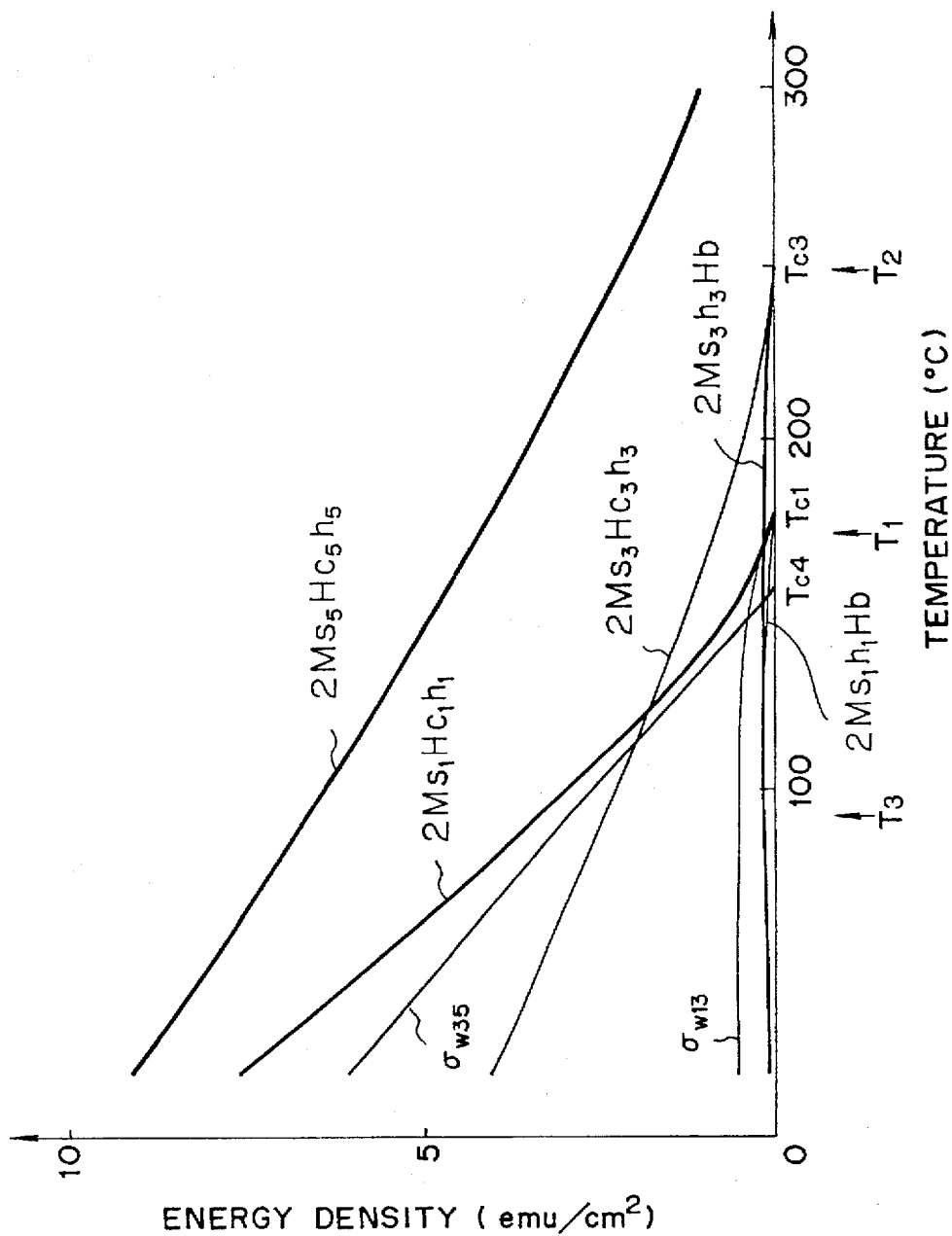
FIG. 3 is a characteristics graph showing a temperature dependency of magnetic characteristics of each magnetic layer in the magnetooptic recording medium which is used in the first embodiment.

A layer (dielectric layer) made by silicon nitride having a film thickness of 80 nm was formed by a sputtering method onto a disk-shaped substrate having a diameter of 86 mm on which spiral-shaped tracks having a pitch of 1.6 μm and a land width of 1.0 μm were formed. As shown in Table 1, magnetic multilayer films having a five-layer construction comprising magnetic layers 1 to 5 were sequentially formed onto the dielectric layer without breaking a vacuum state. Subsequently, a dielectric layer made of silicon nitride having a film thickness of 60 nm was formed, thereby manufacturing a magnetooptic recording medium (magnetooptic disk) which can perform the overwriting by the light modulation. After that, a magnetic field of about 15 kOe was applied to the whole surface of the magnetooptic recording medium, thereby magnetizing the third and fifth magnetic layers 3 and 5 so that their magnetizing directions are set to the upper directions perpendicular to the film surface. In the magnetooptic recording medium, the magnetic layer 1 corresponds to the first magnetic layer and the magnetic layer 3 corresponds to the second magnetic layer. FIG. 3 shows a temperature dependency of the magnetic characteristics of each magnetic layer in the magnetooptic recording medium.

TABLE 1

| | Material/composition | h (Å) | Tc (°C.) | Ms (emu/cm³) | Hc (kOe) | σ_w (erg/cm²) |
|---|---|---|---|---|---|---|
| Magnetic layer 1 | $Tb_{22}(Fe_{0.9}Co_{0.1})_{78}$ | 300 | 180 | 50 | >20 | |
| Magnetic layer 2 | $Gd_{35}(Fe_{0.65}Co_{0.35})_{65}$ | 200 | 200 | 300 | — | 0.5 |
| Magnetic layer 3 | $Dy_{26}(Fe_{0.92}Co_{0.08})_{74}$ | 200 | 250 | 100 | 10 | |
| Magnetic layer 4 | $Tb_{20}Co_{80}$ | 50 | 160 | 100 | 12 | 6.0 |
| Magnetic layer 5 | | 300 | >300 | 150 | 10 | | h: film thickness
Tc: Curie temperature
Ms: saturation magnetization (value at the room temperature)
Hc: coercive force (value at the room temperature)
σ_w: interface magnetic domain wall energy (value at the room temperature)

The magnetooptic disk is loaded into the above magnetooptic recording/reproducing apparatus and is rotated at a predetermined period of 30 Hz. A laser beam modulated as will be explained hereinafter is irradiated to the disk at the position of a radius of 24 mm while applying a downward recording bias magnetic field Hb of 300 Oe, thereby recording. A wavelength of laser beam is set to 780 nm. A numerical aperture NA of objective lens is set to 0.55. In this instance, when attention is paid to the magnetic layers 1 and 3, as will be explained hereinbelow, it will be understood from a characteristics graph of FIG. 3 that the magnetooptic disk satisfies the medium conditions to apply the recording method of the invention. In the following description, it is now assumed that a saturation magnetization of the ith magnetic layer (i) is set to $Ms_i$, a coercive force is set to $Hc_i$, a film thickness is set to $h_i$, and an interface magnetic domain wall energy density between the ith magnetic layer (i) and the jth magnetic layer (j) is set to $\sigma_{wij}$. The symbols in the equations are consequential.

(1) The magnetic layers 1 and 3 are exchange-coupled and are laminated.

(2) At the ambient temperature (for example, room temperature), since the magnetic layer 3 is oriented in a predetermined upward magnetizing state (a magnetization moment of the iron group is upward because of the iron group element sublattice magnetization dominance) since $$2Ms_3Hc_3h_3 > +2Ms_3Hc_3Hb \pm \sigma_{w13} - \sigma_{w35}$$

The magnetic layer 1 is oriented in an arbitrary magnetizing state independently of the magnetic layer 3 since $$2Ms_1Hc_1h_1 > \pm 2Ms_1Hc_1Hb \mp \sigma_{w13}$$

(3) In the temperature rising step, when the medium temperature is equal to the first temperature $T_1$ (about 180° C.) near the Curie temperature of the magnetic layer 1, $$2Ms_1Hc_1h_1 < -2Ms_1Hc_1Hb + \sigma_{w13}$$

and the following relation is maintained $$2Ms_3Hc_3h_3 > +2Ms_3Hc_3Hb \pm \sigma_{w13} - \sigma_{w35}$$

Therefore, the magnetic layer 1 is oriented in a state in which the coupling by the exchange-coupling force is stable by the magnetizing state of the magnetic layer 3.

(4) In the temperature rising step, when the medium temperature is equal to the second temperature $T_2$ (about 250° C.) near the Curie temperature of the magnetic layer 3, $$2Ms_3Hc_3h_3 < +2Ms_3Hc_3Hb - \sigma_{w13} - \sigma_{w35}$$

is satisfied. Therefore, the magnetizing state of the magnetic layer 3 is inverted by the recording bias magnetic field Hb and the magnetization is set to a downward direction, so that the magnetic layer 3 is set into a magnetizing state different from the predetermined magnetizing state (magnetizing state at the ambient temperature).

(5) In the cooling step after heating to a temperature of $T_2$ or higher, when the medium temperature is equal to the third temperature $T_3$ (about 100° C.) which is equal to or lower than about the Curie temperature of the magnetic layer 4, an interface magnetic wall energy density $\sigma_{w35}$ between the magnetic layers 3 and 5 increases and $$2Ms_3Hc_3h_3 < -2Ms_3Hc_3Hb - \sigma_{w13} + \sigma_{w35}$$

Therefore, since the following relation $$2Ms_5Hc_5h_5 > +2Ms_5Hc_5h_5 + \sigma_{w35}$$

is maintained in the whole temperature range during this period of time, the magnetizing state of the magnetic layer 3.is again reversed, so that the magnetization is set to an upward direction. In this instance, since $$2Ms_1Hc_1h_1 > \mp 2Ms_1Hc_1Hb \pm \sigma_{w13}$$

is satisfied, the magnetic layer 1 holds the magnetizing state just before independently of the magnetic layer 3.

In case of cooling without heating to $T_2$, since $$2Ms_3Hc_3h_3 > +2Ms_3Hc_3Hb \pm \sigma_{w3} - \sigma_{w35}$$

is satisfied, the magnetizing state of the magnetic layer 3 does not change and is held in the upward direction. Therefore, in all cases, the magnetic layer 3 is oriented into the predetermined magnetizing state (the first magnetizing state before the temperature is raised) at a temperature which is equal to or lower than $T_3$.

Figure 4:
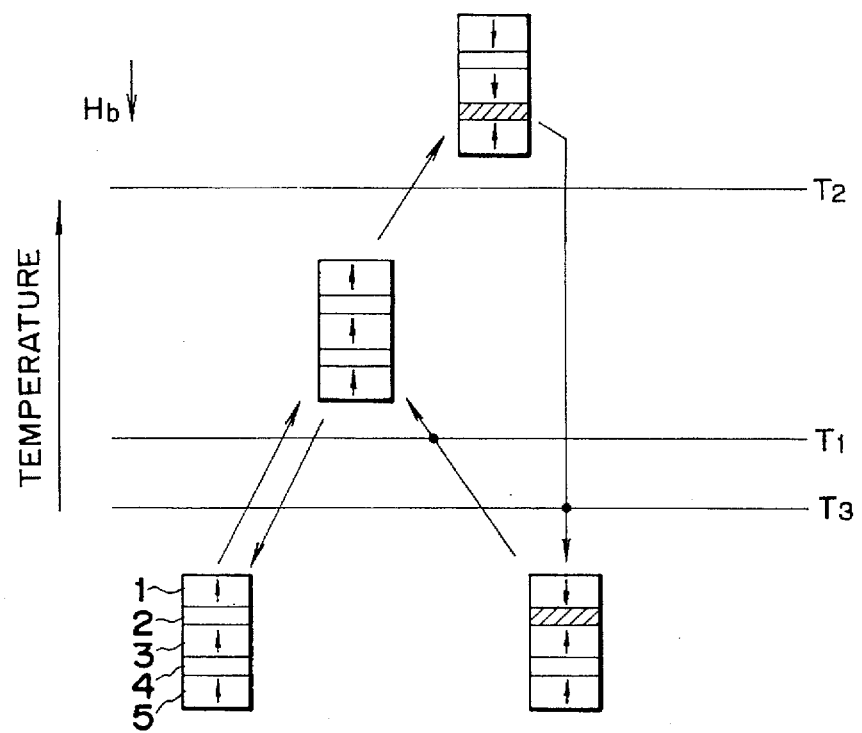
FIG. 4 is a diagram for explaining a recording step in the first embodiment.

As mentioned above, the magnetooptic recording medium satisfies the medium conditions of the invention. In this instance, however, the coercive force energies and Zeeman energies of the magnetic layers 2 and 4 are ignored because they hardly exert an influence on the operation of the magnetization. The Bloch magnetic wall energies and diamagnetic field energies are also ignored for a similar reason. The change in orientation of the magnetizing state of each magnetic layer depending on the temperature which has been described here is diagrammatically shown in FIG. 4.

The magnetic layers 2 and 4 are the magnetic layers (adjusting layers) which are interposed in order to set the magnitudes of $\sigma_{w13}$ and $\sigma_{w35}$ and the temperature dependencies to desired characteristics as shown in FIG. 3. For this purpose, as a material of the magnetic layer 2, a material such that a Curie temperature is equal to or higher than about $T_{c1}$ ($T_{c1}$ denotes a Curie temperature of the magnetic layer 1) and a magnetic domain wall energy is as small as possible is preferably selected. As a material of the magnetic layer 4, it is desirable to select a material such that a Curie temperature is equal to or lower than about $T_{c1}$ and a magnetic domain wall energy is as large as possible.

The recording of information to the above magnetooptic recording medium will now be described.

Figure 5A:
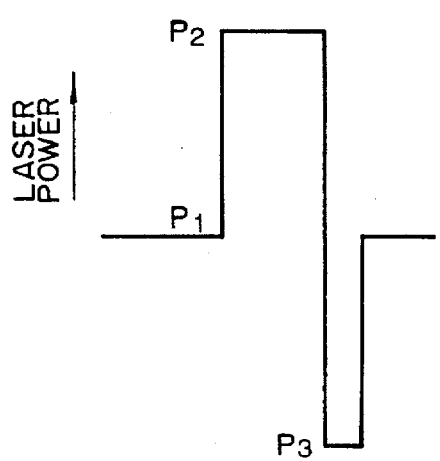
FIG. 5A is a characteristics diagram showing a construction of a modulation laser signal.
Figure 5B:
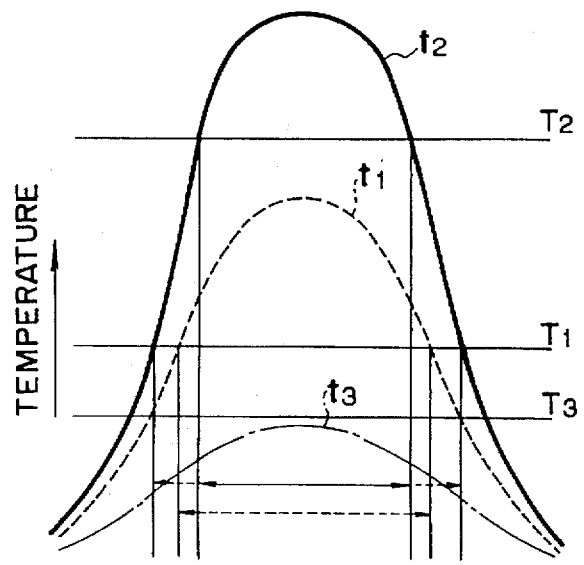
FIG. 5B is a characteristics diagram showing a temperature distribution corresponding to a laser power.

Although a power of a laser beam which is irradiated onto the magnetooptic recording medium is modulated in accordance with information to be recorded, a modulation laser signal at three levels shown in FIG. 5A is used in accordance with a data signal in the first embodiment. That is, the modulation laser signal comprises: a portion of a laser power $P_1$ whose duration changes in accordance with the data signal to be recorded; a portion of a laser power $P_2$ whose duration changes in accordance with the data signal subsequent to the portion of $P_1$; and a portion of a laser power $P_3$ whose duration constant subsequent to the portion of $P_2$. After the portion of $P_3$, the portion of the laser power $P_1$ for the next data signal continues. There is a relation of $P_3 < P_1 < P_2$ among the laser powers $P_1$ to $P_3$. The portions irradiated by the laser beams of the laser powers $P_1$ to $P_3$ at those three levels show temperature distributions $t_1$ to $t_3$ as shown in FIG. 5B, respectively. For example, the portion irradiated by the laser power $P_2$ shows the Gaussian type temperature distribution and its central portion exceeds the second temperature $T_2$.

When the laser beam of the laser signal whose power changes as shown in (a) in FIG. 6 is irradiated on the magnetooptic recording medium while moving it, the medium is locally heated and its temperature is increased as shown in (b) in FIG. 6 in correspondence to the laser signal. A region surrounded by a solid line is heated to a temperature which is equal to or higher than the temperature $T_2$ and an inversion magnetic domain is formed in this region. A region surrounded by a broken line is subsequently cooled to a temperature of $T_3$ or lower by radiating the heat and the magnetic layer 3 is initialized. After that, it is heated and a temperature is raised to a temperature that is equal to or higher than $T_1$ and is equal to or lower than $T_2$ and a part of the inversion magnetic domain is again inverted and is erased. Therefore, when considering the relative moving directions of the laser beam and the magnetooptic recording medium, a magnetic domain different from the initial state is formed in the hatched portion in (b) in FIG. 6. Namely, a recording mark can be formed at a pitch smaller than the track width.

Figure 10A:
FIGS. 10(A–C) are diagrams showing the relation among the recording signal, the laser signal according to the recording signal, and the temperature distribution in the magnetooptic recording medium.
Figure 10B:
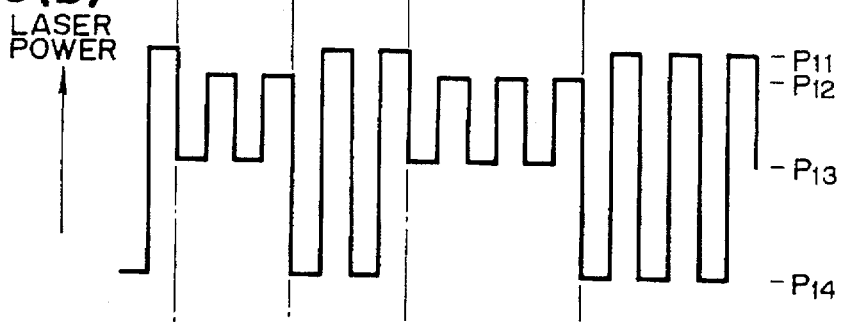
Figure 10C:
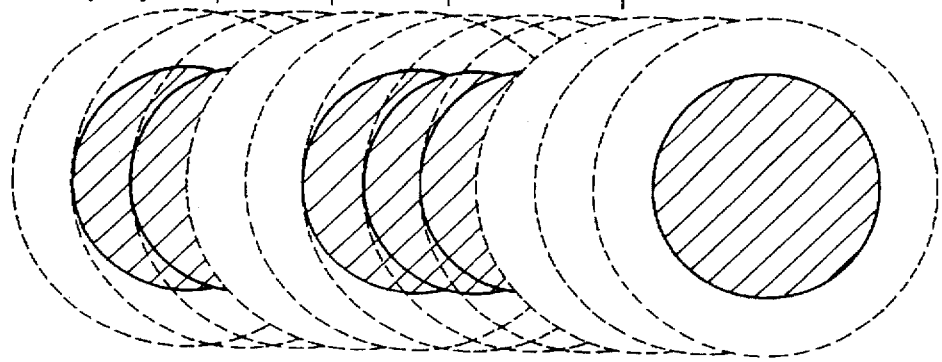

(Second Embodiment) The recording operation was performed in a manner similar to the first embodiment by using the magnetooptic recording medium in the first embodiment except that a modulation pattern of the laser beam which is irradiated is changed. FIG. 7 is a diagram showing the relation between the laser power and the temperature distribution in the second embodiment. In the second embodiment, the laser power $P_1$ among the three levels $P_1$ to $P_3$ is set to be higher than that in the first embodiment. Thus, in the temperature distribution $t_1$ corresponding to the laser power $P_1$, the temperature of the central portion is slightly higher than $T_2$. When the laser beam whose power changes as shown in (a) in FIG. 8 is irradiated in accordance with the data signal, a portion surrounded by a solid line in (b) in FIG. 8 is heated to a temperature which is equal to or higher than the temperature $T_2$. A region surrounded by a broken line corresponds to a range in which it is cooled to a temperature of $T_3$ or lower and, after that, it is heated to a temperature of $T_1$ or higher. In (b) in FIG. 8, although a plurality of solid lines or broken lines are shown, each of the lines corresponds to pulse at $P_1$ or $P_2$. In this case, as shown in (b) in FIG. 8, with regard to a region of the temperature $T_1$ or higher corresponding to the power level $P_1$, the temperature of its central portion has reached $T_2$ or higher. Therefore, when a region including the rear portion of the mark formed in the region whose temperature has already reached $T_2$ or higher by the irradiation of the laser beam at the power level $P_2$ is heated to a temperature of $T_1$ or higher by the irradiation of the laser beam of the subsequent power level $P_1$ and is erased, a new mark is formed in the central portion. This mark, however, is completely erased by the irradiation of the laser beam of the subsequent laser power of $P_1$ or $P_2$. Thus, a distribution of the mark which is finally formed is as shown by a hatched region. By using such a method, since the temperature $T_2$ can be set to a relatively low value, the recording sensitivity can be improved.

magnetooptic recording medium in accordance with a data signal shown in (a) in FIG. 10. In this case, by selecting either one of the power levels $P_{13}$ and $P_{14}$, whether or not the recording layer is cooled to a temperature of $T_3$ or lower after completion of the irradiation of the laser pulse can be controlled. Therefore, whether the mark formed by one certain pulse is erased by the temperature increase by the next pulse or not can be selected. Therefore, a mark as shown by a hatched region in (c) in FIG. 10 is formed.

By executing the recording as mentioned above, a mark can be always formed in a constant temperature state irrespective of the recording pattern. Therefore, there is no recording pattern dependency of the influence by the thermal interference and the jitter remarkably decreases.

(Fourth Embodiment)

Four kinds of magnetic layers shown in Table 2 were sequentially laminated by manufacturing steps similar to those of the magnetooptic recording medium used in the first embodiment. After that, a layer of silicon nitride having a film thickness of 10 nm was formed as a dielectric layer. Further, an aluminum layer having a thickness of 40 nm was subsequently formed, thereby manufacturing a magnetooptic recording medium (magnetooptic disk) which can overwrite by the light modulation. After that, a magnetic field of about 15 kOe was applied to the whole surface of the magnetooptic recording medium. The magnetic layers 3 and 5 were magnetized so that the magnetizing directions are set to the upward directions perpendicular to the film surface. A reason why a film thickness $h_2$ of magnetic layer 2 is equal to 0 in Table 2 is because the magnetic layer 2 is not formed. Consequently, the magnetic layers 1 and 3 are directly in contact with each other.

TABLE 2

| | Material/composition | h (Å) | Tc (°C.) | Ms (emu/cm$^3$) | Hc (kOe) | $\sigma_w$ (erg/cm$^2$) |
|---|---|---|---|---|---|---|
| Magnetic layer 1 | Tb$_{23}$(Fe$_{0.87}$Co$_{0.1}$Cr$_{0.03}$)$_{78}$ | 200 | 160 | 0 | >20 | ⎫ |
| Magnetic layer 2 | — | 0 | — | — | — | ⎬ 0.6 |
| Magnetic layer 3 | Tb$_{25}$(Fe$_{0.77}$Co$_{0.2}$Cr$_{0.03}$)$_{75}$ | 180 | 220 | 120 | 10 | ⎭ |
| Magnetic layer 4 | Tb$_{20}$(Fe$_{0.85}$Co$_{0.12}$Cr$_{0.03}$)$_{80}$ | 50 | 180 | 150 | 7.8 | ⎫ 5.8 |
| Magnetic layer 5 | Tb$_{26}$(Fe$_{0.63}$Co$_{0.34}$Cr$_{0.03}$)$_{74}$ | 200 | 150 | 150 | 9.5 | ⎭ |

The definition of h, Tc, Ms, Hc, and $\sigma_w$ is the same as shown in Table 1.

(Third Embodiment)

Figure 9:
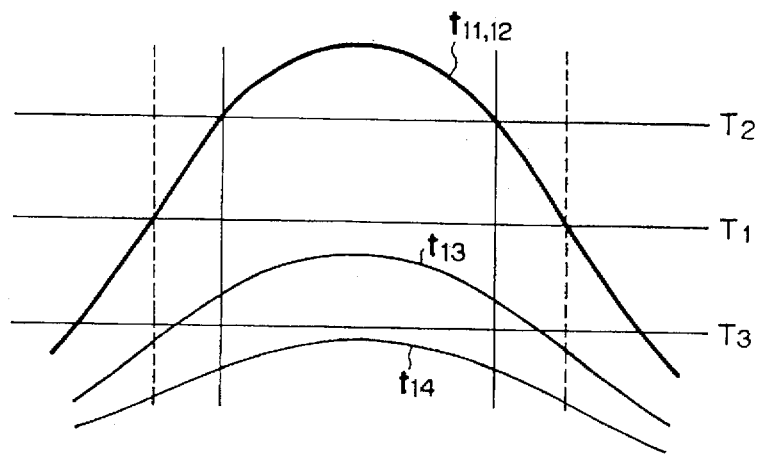
FIG. 9 is a diagram showing the relation between the laser power and the temperature distribution in the third embodiment.

Although the recording has been performed by using the laser powers at three levels in the first and second embodiments, the third embodiment intends to execute the recording by using laser powers $P_{11}$ to $P_{14}$ at four levels. Although there is a relation of $P_{14} < P_{13} < P_{12} < P_{11}$ among them, a difference between $P_{11}$ and $P_{12}$ is not so large. FIG. 9 shows temperature distributions $t_{11}$ to $t_{14}$ which are caused in correspondence to the laser powers $P_{11}$ to $P_{14}$, respectively. After the smallest power level $P_{14}$, the largest power level $P_{11}$ certainly comes. After that, the power levels $P_{12}$ and $P_{13}$ follow. Therefore, the temperature distributions $t_{11}$ and $t_{12}$ corresponding to the power levels $P_{11}$ and $P_{12}$ are almost the same and exceed the temperature $T_2$. On the other hand, the temperature distribution $t_{13}$ corresponding to $P_{13}$ exceeds $T_3$ but does not reach $T_1$. The temperature distribution $t_{14}$ corresponding to $P_{14}$ does not exceed $T_3$.

The recording operation was executed to the magnetooptic recording medium of the first embodiment by using such laser pulses in a manner similar to the first embodiment. A laser signal as shown in (b) in FIG. 10 is irradiated on the The magnetooptic recording medium was loaded into the magnetooptic recording and/or reproducing apparatus and was rotated at a predetermined period of 60 Hz. A laser beam modulated as will be explained hereinafter was irradiated the medium at the position of a radius of 40 mm while applying the upward recording bias magnetic field Hb of 300 Oe, thereby performing the recording. An optical system used for measurement is similar to that in the first embodiment.

In the magnetooptic recording medium, a metal layer (aluminum layer here) of large heat conductivity was added so as to correspond to the high speed recording, thereby raising a thermal response speed. By setting the Curie temperature of the magnetic layer 4 to be higher than the Curie temperature of the magnetic layer 1, the first temperature $T_1$ is about 150° to 160° C. and the third temperature $T_3$ is about 140° to 150° C. and they are set to close values. Therefore, the medium can be initialized by a temperature that is enough higher than the ambient temperature and a cooling time for initialization can be reduced.

As materials of the magnetic layers 3 and 5, there are used compositions which are rare earth element sublattice magnetization dominant at the ambient temperature and have a compensation temperature. Therefore, the magnetizing direction of each of the magnetic layers 3 and 5 is set to the same direction as the direction of the recording bias magnetic field Hb that is applied upon recording. Although the magnetic layer 2 has been provided for adjustment of the interface magnetic wall energy in the first embodiment, such a magnetic layer 2 is omitted in the fourth embodiment. In place of it, after the magnetic layer 1 was formed, it is left for a little while and its surface is purposely polluted and the magnetic layer 3 is laminated after that, thereby controlling the interface magnetic wall energy density $\sigma_{w13}$ between the magnetic layers 1 and 3. A change in magnetizing state corresponding to the temperature change in the magnetooptic recording medium can be described in a manner almost the same to that in case of the medium of the first embodiment and the above medium conditions are satisfied. FIG. 11 is a characteristics diagram showing a temperature dependency of the magnetic characteristics of each magnetic layer in the magnetooptic recording medium.

Laser powers which are used to record to the magnetooptic recording medium are set to seven levels which satisfy a relation of $P_{IB} < P_{EB} < P_{WB} < P_E < P_{EO} < P_W < P_{WO}$. That is, when a data signal as shown in (b) in FIG. 12 which is synchronized with a channel clock ((a) in FIG. 12) of a predetermined period $\tau$ is inputted, the laser power which is irradiated to the magnetooptic recording medium changes as shown in (c) in FIG. 12. A mark edge recording method of the (1, 7) modulation is used as a modulation recording method here and a rate of channel clocks is set to 60 Mbps. Thus, the shortest mark length is set to about 0.5 μm and a linear recording density is set to about 0.38 μm/bit.

The irradiation laser signal shown in (c) in FIG. 12 is synchronized with the channel clock and the power level changes each time leading and trailing edges of the channel clock come. By regarding such a change in power level as a pulse signal, a duty ratio is set to 50% and, accordingly, a pulse width is set to 8.3 nsec.

The relation between the power level of the irradiation laser signal and the temperature of the medium will now be described with reference to FIG. 13. By irradiating the pulse of the power level $P_W$, a temperature state which is expressed by the temperature distribution $t_2$ is formed. A temperature of the region corresponding to the whole land width L ((d) in FIG. 12) is raised to $T_2$ or higher, so that a recording process occurs. On the other hand, by irradiating a pulse of the power level $P_E$, a temperature state which is expressed by the temperature state $t_1$ is formed, a temperature of the region corresponding to the land width L is equal to or higher than $T_1$, and an erasing process occurs. The power levels $P_{WO}$ and $P_{EO}$ of the head pulse of each process are set in a manner such that since the temperature in a state just before is lower than that upon irradiation of the subsequent pulse, the power levels are set to be higher than those of the subsequent pulse, thereby allowing a temperature state after the pulse was irradiated to be almost equal to that after completion of the irradiation of the subsequent pulse.

The relation between the binary data signal and the laser driving waveform is as shown in (b) and (c) in FIG. 12. After the pulse of the power level $P_W$ was irradiated to the data signal (duration is equal to n·$\tau$) of the high level by (n−1) times, the pulse irradiation is stopped for only a period of time of 1$\tau$ and the pulse is held at the power level $P_{IB}$. After that, the pulse of the power level $P_E$ is irradiated by only the number of times corresponding to the duration of the data signal of the low level.

Thus, when the data signal is shifted from the high level to the low level, the data signal is held to a low power level of $P_{IB}$ for a relatively long time of 25 nsec after the pulse of the power level $P_W$ was irradiated. Therefore, the region which was heated just before in the recording process is set into a temperature state as shown by a temperature distribution $t_3$ in FIG. 13 by the heat radiation and is cooled to $T_3$ or lower and the magnetic layer 3 is initialized. By irradiating the subsequent pulse, a part of the mark formed just before the region is heated to a temperature of $T_1$ or higher and is erased.

In a period of time other than the level transition, the pulse interval is so short to be 8.3 nsec and a proper bias power $P_{WB}$ or $P_{EB}$ has been applied, so that the region heated just before is not cooled to a temperature of $T_3$ or lower for a period of time until the subsequent pulse is irradiated. Therefore, the recording mark in the region in which the recording process occurred remains. A magnetic domain as shown in (c) in FIG. 12 is finally formed. Although the power level $P_{EB}$ can be decreased to a level such that the initializing process occurs, in order to suppress the laser power which is required for recording, it is desirable to set the laser power to a level that is higher by a certain degree.

By using the method as mentioned above, a duration of the jitter when a random signal was recorded is equal to 1.8 nsec. On the other hand, a C/N (carrier to noise) ratio when a pattern was repetitively recorded for a period of time of 2$\tau$ is equal to 42 dB.

(First Comparison Example)

The recording operation was performed to the magnetooptic recording medium of the fourth embodiment in a manner similar to the fourth embodiment except that an irradiation laser beam was driven as shown in (c) in FIG. 14. That is, a mark edge recording method of the (1, 7) modulation is used as a modulation recording method. A rate of channel clocks is set to 60 Mbps. Thus, the shortest mark length is equal to about 0.5 μm and a linear recording density is equal to about 0.38 μm/bit.

Both of the data signal and the irradiation laser signal shown in (b) in FIG. 14 are synchronized with the channel clock ((a) in FIG. 14). A duty ratio of the channel clocks is set to 50%, so that a pulse width is set to 8.3 nsec. In the comparison example, as shown in (b) and (c) in FIG. 14, there is a relation between the binary data signal comprising the low level and the high level and the laser waveform. Namely, in a state in which a pedestal power of the power level $P_E$ has been applied, the pulse of the power level $P_W$ is irradiated by (n−1) times for the duration (n·$\tau$) of the data signal of the high level. By the irradiation of the pulse of the power level $P_W$, as shown in (d) in FIG. 14, the region corresponding to the whole land width L (region in the solid line in the diagram) is set to a temperature of $T_2$ or higher, so that a recording process occurs. On the other hand, by irradiating the pulse of the power level $P_E$, the region corresponding to the whole land width L (region in a broken line shown in the diagram) is set to a temperature of $T_1$ or higher, so that an erasing process occurs. The power level $P_{WO}$ of the head pulse in the recording pulse is set to be higher than the level of the subsequent pulse because the temperature just before the irradiation of the pulse is lower than that upon irradiation of the subsequent pulse, thereby almost equalizing the temperature after the pulse was irradiated to the temperature after completion of the irradiation of the subsequent pulse.

Thus, even when a state transition of the data signal occurs from the high level to the low level, the region in which a recording process occurs by being heated just before is held at a temperature of $T_1$ or higher by the irradiation of the subsequent pulse of the power level $P_E$ without once being cooled to a temperature of $T_3$ or lower by the heat radiation, so that no erasing process occurs even at a temperature of $T_1$ or higher. Consequently, all of the recording marks in the region in which the recording process occurred remain and magnetic domains (marks) as shown by hatched regions in (d) in FIG. 14 are formed.

By the above method, a duration of jitter when the random signal has been recorded is equal to 4.8 nsec. A C/N ratio when the pattern has been repetitively recorded for a duration of $2_\tau$ is equal to 32 dB.

A power dependency of the recording characteristics were examined. Thus, in the case where the power level $P_W$ was reduced and a magnetic domain smaller than the land width L was formed as shown in (e) of FIG. 14, good recording characteristics were obtained. Even in this case, a duration of jitter when the random signal has been recorded is equal to 3.6 nsec and a C/N ratio when a pattern has repetitively been recorded for a duration of $2_\tau$ is equal to 36 dB.

(Second Comparison Example)

The recording operation was performed by using a medium similar to the magnetooptic recording medium in the first embodiment in a manner almost similar to the fourth embodiment except that the Curie temperature of the magnetic layer 4 is set to 120° C. In the magnetooptic recording medium in the second comparison example, since $T_3$ is lower (50° to 70° C.) than the temperature of the medium of the fourth embodiment and no heat radiating layer exists, a cooling speed is slow.

Figure 15A:
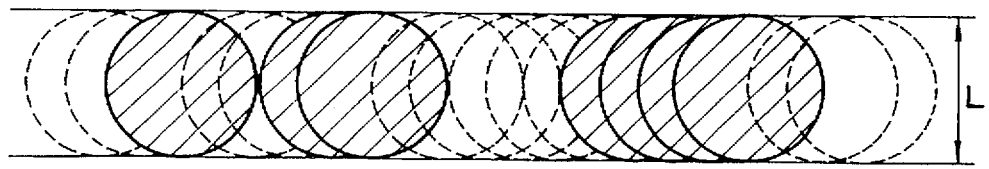
FIGS. 15A and 15B are diagrams showing shapes of magnetic domains recorded in the second comparison example.

Thus, when the data signal is shifted from the high level to the low level, even when the pulse is held at the low power level of $P_{IB}$ for a relatively long time of 25 nsec after the pulse of the power level $P_W$ was irradiated, the region which was heated just before and in which the recording process occurred is not cooled to a temperature of $T_3$ or lower by the heat radiation. Therefore, even when a temperature of a part of the mark formed just before is raised to a temperature of $T_1$ or higher by the irradiation of the subsequent pulse, the mark in the portion whose temperature was raised is not erased. Thus, all of the recording marks in the region in which the recording process occurred remain and magnetic domains (marks) as shown by hatched regions in FIG. 15A are formed.

Figure 15B:
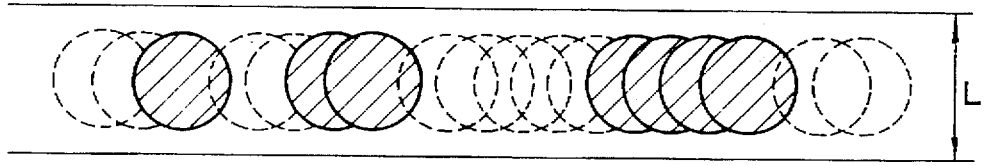

By the above method, a duration of a jitter when the random signal has been recorded is equal to 3.5 nsec. A C/N ratio when a pattern has repetitively been recorded for a duration of $2_{96}$ is equal to 32 dB. A power dependency of the recording characteristics was examined. Thus, by reducing the power level $P_W$, in the case where the magnetic domain smaller than the land width L as shown by a hatched region in FIG. 15B is formed, good recording characteristics were obtained. In this case as well, however, a duration of a jitter when the random signal has been recorded is equal to 3.0 nsec. A C/N ratio when a pattern has repetitively been recorded for a duration of $2_{96}$ is equal to 36 dB.

(Fifth Embodiment)

In a manufacturing step similar to the first embodiment, three kinds of magnetic layers 1 to 3 shown in Table 3 were sequentially laminated. An alloy layer having a film thickness of 40 nm of tantalum and aluminum was formed, thereby manufacturing a magnetooptic recording medium (magnetooptic disk) which can overwrite by the light modulation. FIG. 16 shows a temperature dependency of the magnetic characteristics of each magnetic layer in the magnetooptic recording medium.

TABLE 3

| | Material/compositions | h (Å) | Tc/Tcomp (°C.) | Ms (emu/cm$^3$) | Hc (kOe) | $\sigma_w$ (erg/cm$^2$) |
|---|---|---|---|---|---|---|
| Magnetic layer 1 | Tb$_{25}$(Fe$_{0.9}$Co$_{0.1}$)$_{75}$ | 300 | 180/100 | 80 | 15 | ⎫ |
| Magnetic layer 2 | Gd$_{30}$(Co$_{0.9}$Al$_{0.1}$)$_{70}$ | 100 | 220/— | 320 | — | ⎬ 0.6 |
| Magnetic layer 3 | (Gd$_{0.8}$Tb$_{0.2}$)$_{27}$(Fe$_{0.5}$Co$_{0.5}$)$_{73}$ | 250 | >300/200 | 200 | 0.4 | ⎭ |

The definition of h, Tc, Ms, Hc, and $\sigma_w$ are the same as those in Table 1.
Tcomp: compensation temperature Now, considering the case of recording onto the above magnetooptic recording medium under conditions such that the upward bias magnetic field Hb of 1000 Oe is applied to the medium, the magnetooptic recording medium satisfies the above medium conditions as will be explained hereinlater.

(1) The magnetic layers 1 and 3 are exchange-coupled and are laminated. That is, the magnetic layer 1 corresponds to the first magnetic layer and the magnetic layer 3 corresponds to the second magnetic layer.

(2) At the ambient temperature, the magnetic layer 3 is oriented into a predetermined upward magnetizing state (the magnetic moment of the iron group element is set into the downward direction because of the rare earth element sublattice magnetization dominance) because $$2Ms_3Hc_3h_3 > -2Ms_3Hc_3Hb \pm \sigma_{w13}$$

The magnetic layer 1-is oriented into an arbitrary magnetizing state independently of the magnetic layer 3 because $$2Ms_1Hc_1h_1 > \pm 2Ms_1Hc_1Hb \pm \sigma_{w13}$$

(3) At a temperature rising step, when the medium temperature is set to the first temperature $T_1$ (about 170° C) near the Curie temperature of the magnetic layer 1, $$2Ms_1Hc_1h_1 < -2Ms_1Hc_1Hb \pm \sigma_{w13} \text{ since}$$

$$2Ms_3Hc_3h_3 > +2Ms_3Hc_3Hb \pm \sigma_{w13}$$

is maintained, the magnetic layer 1 is oriented into a state in which the coupling by the exchange-coupling force is stable due to the magnetizing state of the magnetic layer 3.

(4) In the temperature rising step, when the medium temperature is set to the second temperature $T_2$ (about 230° C.) that is higher than $T_1$ and is higher than the compensation temperature of the magnetic layer 3, the magnetizing state of the magnetic layer 3 is reversed from the state before the temperature rises, so that the magnetization becomes unstable for the bias magnetic field Hb. Since $$2Ms_3Hc_3h_3 < +2Ms_3Hc_3Hb - \sigma_{w13}$$

is satisfied for the magnetic layer 3 in the above state, the magnetic layer 3 is oriented into the magnetizing state different from the predetermined magnetizing state (magnetizing state at the ambient temperature) because the magnetizing state is reversed and the magnetic moment of the iron group element is set to the upward direction.

(5) After the magnetic layer 3 was heated to a temperature of $T_2$ or higher, it is cooled, the magnetic layer 3 is cooled to the compensation temperature or lower and the magnetization is reversed as compared with the state before cooling and becomes unstable for the bias magnetic field Hb. When the medium temperature is set to the third temperature $T_3$ (about 120° C.) as a proper temperature lower than $T_1$, $$2Ms_3Hc_3h_3 < +2Ms_3Hc_3Hb -_{w13}$$

is satisfied. The magnetization of the magnetic layer is reversed and the magnetic moment of the iron group element is set into the downward direction. In this instance, since $$2Ms_1Hc_1h_1 > \mp 2Ms_1Hc_1Hb \pm \sigma_{w13}$$

is satisfied, the magnetic layer 1 holds the magnetizing state just before independently of the magnetic layer 3.

In case of cooling the magnetic layer without heating to a temperature of $T_2$ or higher, the magnetizing state is stable for the bias magnetic field Hb from the beginning. The magnetic moment of the iron group element of the magnetic layer 3 is held in the downward direction and the magnetizing state does not change. In any of the above cases, therefore, the magnetic layer 3 is oriented into the predetermined magnetizing state.

As described above, the magnetooptic recording medium satisfies the above medium conditions.

In each of the above embodiments, the recording operation has been executed by using the laser power of multi-values. In the embodiment, however, the recording operation is performed to the magnetooptic disk by modulating a width of laser pulse. That is for a data signal ((b) in FIG. 17) synchronized with a channel clock ((a) in FIG. 17), a laser pulse shown in (c) in FIG. 17 was irradiated to the magnetooptic recording medium. When the data signal is at the high level, the pulse width is equal to $\tau_W$. By the irradiation of such a pulse, as shown in (d) in FIG. 17, the region corresponding to the whole land width L (region in the solid line in the diagram) is heated to a temperature of $T_2$ or higher, so that a recording process occurs. On the contrary, when the data signal is at the low level, by the irradiation of the pulse of a width $\tau_E$ (where, $\tau_E < \tau_W$), the region in the whole land width L (region in the broken line in the diagram) is set to a temperature that is equal to or higher than $T_1$ and is less than $T_2$. Since each laser pulse is synchronized with the channel clock (period $\tau$), an interval $\tau_I$ ($=\tau-\tau_E$) between the laser pulses when the data signal is at the low level including the case where a state transition of the data signal occurs from the high level to the low level) is long enough. The temperature of the magnetooptic recording medium is lower than $T_3$ for such a time interval. Therefore, by irradiating the pulse of a width $\tau_E$ subsequent to the interval $\tau_I$ the magnetic layer 3 in the region corresponding to the whole land width L is initialized and an erasing process is executed. By the above operation, magnetic domains of shapes as shown by hatched portions in (d) in FIG. 17 are formed on the magnetooptic recording medium. A pitch of the recording mark in the experimental examples is shorter than the land width L.

Although each of the embodiments of the invention has been described above, by embodying the recording method of the invention, marks of a pitch which is relatively shorter than the track width can be stably formed without changing the mark size in the track width direction. The recording operation can be executed at a high linear density. Such a recording at a high linear density is particularly useful in case of applying, for example, a reproducing method of a partial response or the like.

Since a length of mark which is finally formed by the recording method of the invention is equal to a difference between the length of region in which the magnetic domain is once formed and the length of region in which the magnetic domain is erased just after it was formed, a fluctuation in the mark length is suppressed for a temperature change or a fluctuation in laser power.

Furthermore, since the magnetic layer is once cooled to a temperature of the third temperature $T_3$ or less after the recording mark was formed, when a mark is recorded just after, an influence by the thermal diffusion decreases. A fluctuation of the edge position of the mark that is formed due to the recording pattern decreases. A jitter of an edge signal which is detected is suppressed.

What is claimed is:

1. An overwritable magnetooptical information recording method for effecting recording of information by irradiating a magnetooptic recording medium with a light beam while moving the recording medium which includes at least a first magnetic layer and a second magnetic layer and which satisfies the following conditions:

(1) the first and second magnetic layers are mutually exchange-coupled;

(2) in an environmental temperature, the magnetization of the second magnetic layer is oriented to a predetermined direction and the magnetization of the first magnetic layer is oriented to an arbitrary direction independently of the second magnetic layer;

(3) in a heating or cooling process of the recording medium, when a medium temperature is a temperature $T_1$, which is higher than the environmental temperature, the magnetization of the first magnetic layer is oriented in a direction that the coupling due to the exchange-coupling force to the second magnetic layer assumes a stable state;

(4) in the heating or cooling process of the recording medium, when the medium temperature is a temperature $T_2$, which is higher than the temperature $T_1$, the magnetization of the second magnetic layer is oriented in a direction different from the predetermined direction, and (5) in the cooling process of the recording medium, when the medium temperature is a temperature $T_3$, which is higher than the environmental temperature but lower than the temperature $T_1$, the magnetization of the second magnetic layer is oriented in the predetermined direction and the first magnetic layer maintains the most recent magnetizing state independently of the second magnetic layer, said method comprising:

a first recording step for irradiating the recording medium with a light beam which is adjusted such that the temperature of the first magnetic layer rises to the temperature $T_1$ or higher so as to cause the condition (3), in accordance with the information;

a second recording step for irradiating the recording medium with a light beam which is adjusted such that the temperature of the second magnetic layer rises to the temperature $T_2$ or higher so as to cause the condition (4), in accordance with the information; and a third recording step for irradiating the recording medium with a light beam which is adjusted such that the recording medium is cooled to the temperature $T_3$ or lower after irradiation of the recording medium with the light beam adjusted such that the temperature of the second magnetic layer rises to the temperature $T_2$ or higher, during a recording operation of a series of data signals, wherein said third recording step is executed at the time of switching to said first recording step from said second recording step, and wherein a portion of the region rendered to the condition (4) by said second recording step is subjected to said first recording step subsequently executed and after completion of said first recording step, the portion is caused to assume the condition (3).

2. A method according to claim 1, wherein a difference between the temperatures $T_1$ and $T_3$ is not more than 80° C.

3. A method according to claim 1, wherein the adjustment of the light beam is performed by adjusting an intensity of the light beam.

4. A method according to claim 1, wherein the light beam in said first and second kind of recording steps is pulse-modulated, and the adjustment of the light beam is performed by adjusting a width of the pulse.

5. A magnetooptical recording medium comprising at least first and second magnetic layers which satisfy the following conditions:

(1) said first and second magnetic layers are mutually exchange-coupled;

(2) at an ambient temperature, said second magnetic layer is oriented into a predetermined magnetizing state and said first magnetic layer is oriented into an arbitrary magnetizing state independently of the second magnetic layer;

(3) in a temperature rising step or cooling step of said magnetooptical recording medium, when a temperature is equal to the first temperature $T_1$, that is higher than said ambient temperature, the first magnetic layer is oriented into a state in which the coupling by an exchange-coupling force with the second magnetic layer is stable;

(4) in a temperature rising step or cooling step of the magnetooptical recording medium, when the temperature is equal to the second temperature $T_2$ that is higher than the first temperature $T_1$, the second magnetic layer is oriented into a magnetizing state different from said predetermined magnetizing state;

(5) in a cooling step of the magnetooptical recording medium, when the temperature is equal to the third temperature $T_3$ that is higher than the ambient temperature and is lower than the first temperature $T_1$, the second magnetic layer is oriented into said predetermined magnetizing state and the first magnetic layer maintains the most recent magnetizing state independently of said second magnetic layer; and (6) a difference between the first temperature $T_1$ and the third temperature $T_3$ is less than 40° C.

6. A magnetooptical recording medium according to claim 5, wherein third and fourth magnetic layers are sequentially laminated so as to be adjacent to said second magnetic layer, said fourth magnetic layer can hold a predetermined magnetizing state in the whole temperature rising and cooling steps upon recording, and a Curie temperature of said third magnetic layer is higher than a Curie temperature of the first magnetic layer.

* * * * *

UNITED STATES PATENT AND TRADEMARK OFFICE
CERTIFICATE OF CORRECTION

PATENT NO. : 5,751,669

DATED : May 12, 1998

INVENTOR(S): TSUTOMU SHIRATORI

It is certified that error appears in the above-identified patent and that said Letters Patent is hereby corrected as shown below:

On the title page,
Item [57] <u>ABSTRACT</u>:

Line 2, delete "is".

<u>COLUMN 1</u>:

Line 14, "magneooptic" should read --magnetooptic--.

<u>COLUMN 2</u>:

Line 39, "FIG. 8(A-B) should read --FIGS. 8(a) and (b)--;
Line 46, "FIGS. 10 (A-C) should read --FIGS. 10(a)-10(c)--;
Line 54, "FIGS. 12(A-D) should read --FIGS. 12(a)-12(d)--; and
Line 61, "FIGS. 14(A-E) should read --FIGS 14(a)-14(e)--.

<u>COLUMN 3</u>:

Line 5, "FIGS. 17(A-D) should read --FIGS. 17(a)-17(d)--.

UNITED STATES PATENT AND TRADEMARK OFFICE
CERTIFICATE OF CORRECTION

PATENT NO. : 5,751,669

DATED : May 12, 1998

INVENTOR(S) : TSUTOMU SHIRATORI

It is certified that error appears in the above-identified patent and that said Letters Patent is hereby corrected as shown below:

COLUMN 5:

Line 43, delete "a".

COLUMN 6

TABLE 1 should read --

| | Material/composition | $h$ (Å) | $T_c$ (°C) | $M_s$ (emu/cm$^3$) | $H_c$ (kOe) | $\sigma_w$ (erg/cm$^2$) |
|---|---|---|---|---|---|---|
| Magnetic layer 1 | $Tb_{22}(Fe_{0.9}Co_{0.1})_{78}$ | 300 | 180 | 50 | > 20 | 0.5 |
| Magnetic layer 2 | $Gd_{35}(Fe_{0.65}Co_{0.35})_{65}$ | 200 | 200 | 300 | - | |
| Magnetic layer 3 | $Dy_{21}(Fe_{0.7}Co_{0.3})_{79}$ | 200 | 250 | 100 | 10 | 6.0 |
| Magnetic layer 4 | $Tb_{26}(Fe_{0.92}Co_{0.08})_{74}$ | 50 | 160 | 100 | 12 | |
| Magnetic layer 5 | $Tb_{20}Co_{80}$ | 300 | >300 | 150 | 10 | |

--

UNITED STATES PATENT AND TRADEMARK OFFICE
CERTIFICATE OF CORRECTION

PATENT NO. : 5,751,669

DATED : May 12, 1998

INVENTOR(S) : TSUTOMU SHIRATORI

It is certified that error appears in the above-identified patent and that said Letters Patent is hereby corrected as shown below:

COLUMN 7:

Line 58, "3.is" should read --3 is--; and
    Line 67, "$2Ms_3Hc_3h_3 > +2Ms_3Hc_3Hb \pm \sigma_{w3} - \sigma_{w35}$" should read --$2Ms_3Hc_3h_3 > +2Ms_3Hc_3Hb \pm \sigma_{w13} - \sigma_{w35}$--.

COLUMN 9:

Line 1, "The" should read --¶ The--; and
    Line 20, after "to" insert --a--.

COLUMN 10:

Line 50, delete "was"; and
    Line 56, "aluminum layer" should read --aluminum--.

COLUMN 13:

Line 59, "$2_{96}$" should read --$2_r$--; and
    Line 67, "$2_{96}$" should read --$2_r$--.

COLUMN 14:

Line 7, "overwrite by the" should read --overwritten by--.

UNITED STATES PATENT AND TRADEMARK OFFICE
CERTIFICATE OF CORRECTION

PATENT NO. : 5,751,669

DATED : May 12, 1998

INVENTOR(S) : TSUTOMU SHIRATORI

It is certified that error appears in the above-identified patent and that said Letters Patent is hereby corrected as shown below:

COLUMN 15:

Line 11, "$2Ms_3Hc_3h_3<+2Ms_3Hc_3Hb-_{w13}$" should read --$2Ms_3Hc_3h_3<+2Ms_3Hc_3Hb-\sigma_{w13}$--;
Line 52, "level)" should read --level--; and
Line 56, "$\tau_I$" should read --$\tau_I,$--.

COLUMN 18:

Line 3, "$T_1,$" should read --$T_1$--.

Signed and Sealed this

Twenty-fifth Day of May, 1999

Q. TODD DICKINSON

Attest:

*Attesting Officer*  *Acting Commissioner of Patents and Trademarks*